US008628874B2

(12) United States Patent
Kim

(10) Patent No.: US 8,628,874 B2
(45) Date of Patent: Jan. 14, 2014

(54) SECONDARY BATTERY

(75) Inventor: Chan-Seok Kim, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 187 days.

(21) Appl. No.: 13/175,041

(22) Filed: Jul. 1, 2011

(65) Prior Publication Data
US 2012/0196173 A1    Aug. 2, 2012

Related U.S. Application Data

(60) Provisional application No. 61/437,139, filed on Jan. 28, 2011.

(51) Int. Cl.
*H01M 6/46* (2006.01)
*H01M 8/06* (2006.01)

(52) U.S. Cl.
USPC ............................. 429/152; 429/153; 429/423

(58) Field of Classification Search
USPC ................ 429/122, 129, 146, 152, 153, 162
See application file for complete search history.

(56) References Cited

U.S. PATENT DOCUMENTS

| | | | | |
|---|---|---|---|---|
| 5,591,053 | A * | 1/1997 | Imhof et al. ................ | 439/874 |
| 6,117,589 | A | 9/2000 | Satou et al. | |
| 6,335,110 | B1 | 1/2002 | Chang et al. | |
| 2002/0146621 | A1* | 10/2002 | Yageta et al. ............... | 429/181 |
| 2003/0224246 | A1* | 12/2003 | Watanabe et al. ........... | 429/159 |
| 2006/0286452 | A1 | 12/2006 | Takamatsu | |
| 2007/0037054 | A1 | 2/2007 | Kikuchi et al. | |
| 2007/0269714 | A1* | 11/2007 | Watanabe et al. ........... | 429/120 |
| 2009/0017376 | A1 | 1/2009 | Yamamura et al. | |
| 2009/0317717 | A1* | 12/2009 | Ryu et al. .................... | 429/211 |

FOREIGN PATENT DOCUMENTS

| | | | | |
|---|---|---|---|---|
| CN | 101453004 | * | 6/2009 | ............. H01M 2/30 |
| EP | 1901387 | * | 3/2008 | ............ H01M 10/04 |
| FR | 2890244 | | 3/2007 | |
| JP | 09-082332 | | 3/1997 | |
| JP | 10-208753 | | 8/1998 | |
| JP | 11-154502 | | 6/1999 | |
| KR | 10-2008-0034222 | | 4/2008 | |
| WO | WO 2008/130148 | * | 10/2008 | ............. H01M 2/36 |

OTHER PUBLICATIONS

Real Dictionary Encompass Princeton Univ (c) May 26, 2003 Princeton NJ USA {http://www.realdictionary.com/?q=Encompass}.*

* cited by examiner

*Primary Examiner* — Patrick Ryan
*Assistant Examiner* — Aaron Greso
(74) *Attorney, Agent, or Firm* — Robert E. Bushnell, Esq.

(57) ABSTRACT

A secondary battery and a method of manufacturing the same in which the secondary battery includes an electrode assembly having a number of electrode plates and a number of separators. Each separator is disposed between each of the electrode plates of the plurality of electrode plates. Further included is a number of electrode tabs extending from and electrically connected to each of the plurality of electrode plates. The electrode tabs form a stack of electrode tabs by placing each electrode tab of the plurality of electrode tabs one upon another. Still further included is a number of lead members having two ends in which a first end has a space that forms a first part and a second part in the first end of each lead member with the first part and the second part are independent and separate from each other. In addition, the first part and the second part of each lead member are each coupled to the stack of electrode tabs within the battery case.

17 Claims, 10 Drawing Sheets

SECONDARY BATTERY

CLAIM OF PRIORITY

This application claims priority to and the benefit of Provisional Application No. 61/437,139, filed on Jan. 28, 2011, in The United States Patent and Trademark Office, the entire content of which is incorporated herein by reference.

BACKGROUND OF THE INVENTION

1. Field of the Invention

The present invention generally relates to a secondary battery and a method of manufacturing the same.

2. Description of the Related Art

Secondary batteries are applied to various technology fields covering all industry areas. For example, secondary batteries are widely used as an energy source of mobile electronic devices including digital cameras, mobile phones, notebook computers or the like, and are also highlighted as an energy source of hybrid electronic automobiles that are proposed as a solution to solve air pollution caused through the use of gasoline and diesel internal combustion engines using a fossil fuel.

The above information disclosed in this Related Art section is only for enhancement of understanding of the background of the invention and therefore it may contain information that does not form the prior art that is already known to a person of ordinary skill in the art.

SUMMARY OF THE INVENTION

One or more of the exemplary embodiments of the present invention include a secondary battery having improved bond strength between an electrode tab and a lead member.

Further, one or more of the exemplary embodiments of the present invention include a secondary battery having a structure in which charging and discharging efficiencies are improved.

Additional aspects will be set forth in part in the description which follows and, in part, will be apparent from the description, or may be learned by practice of the presented embodiments.

According to an aspect of the present invention, there is provided a secondary battery, including: an electrode assembly having a plurality of electrode plates and a plurality of separators, each separator of the plurality separators is disposed between each of the electrode plates of the plurality of electrode plates; a plurality of electrode tabs extending from and electrically connected to each of the plurality of electrode plates, said plurality of electrode tabs forming a stack of electrode tabs by placing each electrode tab of the plurality of electrode tabs one upon another; and a plurality of lead members having two ends in which a first end has a space that forms a first part and a second part in the first end of each lead member, said first part and said second part are independent and separate from each other, wherein the first part and the second part of each lead member are each coupled to the stack of electrode tabs within the battery case.

The lead member may have a flat rectangular shape.

The electrode tab may have a flat rectangular shape.

An insulating member may be located around the lead member.

The coupling point may be between the electrode plate and the insulating member.

The plurality of electrode plates may include a plurality of positive and negative electrode plates in which each separator of the plurality separators is disposed between each of the positive and negative electrode plates of the plurality of electrode plates.

The plurality of electrode tabs may include a plurality of positive and negative tabs extending from and electrically connected to an uncoated portion of the positive and negative electrode plates respectively, said plurality of positive electrode tabs form a stack of positive electrode tabs by placing each of the positive electrode tabs one upon another and said plurality of negative electrode tabs form a stack of negative electrode tabs by placing each of the negative electrode tabs one upon another.

The plurality of lead members may include a plurality of positive and negative lead members, said first part and said second part of each the positive lead members are each welded to the stack of positive electrode tabs and said first part and the second part of each the negative lead members are each welded to the stack of negative electrode tabs.

The space in each of the lead members partially extends longitudinally in each of the lead members to form the first and second parts the lead members.

The width of the space may be between about 0.5 mm and about 10 mm.

The width of the space may be between about 0.5 mm and about 3 mm.

The width (Wr) of the space with respect to a width (Wt) of the lead member may be in the range of about 0.625% to about 12.5%, said relative ratio is Wr/Wt.

The first part of each lead member may include a first weld part that encompasses a portion of the first part, and the second part of each lead member includes a second weld part that encompasses a portion of the second part.

The combined width of the first and second welding parts may be in the range of about 70 mm to about 79.5 mm excluding the width of the space.

The width (Wr) of the space with respect to a width of the first welding part (Wa) and a width of the second welding part (Wb) may be in a range where Wr/(Wa+Wb) is about 0.629% to about 14.286%.

According to an aspect of the present invention, there is provided a secondary battery, including: an electrode assembly having a plurality of electrode plates and a plurality of separators, each separator of the plurality separators is disposed between each of the electrode plates of the plurality of electrode plates; a plurality of electrode tabs extending from and electrically connected to each of the plurality of electrode plates, said plurality of electrode tabs forming a stack of electrode tabs by placing each electrode tab of the plurality of electrode tabs one upon another; and a plurality of lead members having two ends in which a first end has a space that forms a first part and a second part in the first end of each lead member, said first part and said second part are independent and separate from each other, wherein the first part and the second part of each lead member are each coupled to the stack of electrode tabs within the battery case.

The lead member may have a flat rectangular shape.

The electrode tab may have a flat rectangular shape.

An insulating member may be located around the lead member.

The coupling point may be between the electrode plate and the insulating member.

The plurality of electrode plates may include a plurality of positive and negative electrode plates in which each separator of the plurality separators is disposed between each of the positive and negative electrode plates of the plurality of electrode plates, The plurality of electrode tabs may include a plurality of positive and electrode tabs extending from and electrically connected to an uncoated portion of the positive and negative electrode plates respectively, said plurality of positive electrode tabs form a stack of positive electrode tabs by placing each of the positive electrode tabs one upon another and said plurality of negative electrode tabs form a stack of negative electrode tabs by placing each of the positive electrode tabs one upon another.

The plurality of lead members may include a plurality of positive and negative lead members, said first part and said second part of each the positive lead members are each welded to the stack of positive electrode tabs and said first part and the second part of each the negative lead members are each welded to the stack of negative electrode tabs.

The space in each of the lead members partially extends longitudinally in each of the lead members to form the first and second parts the lead members.

The width of the space may be between about 0.5 mm and about 10 mm.

The width of the space may be between about 0.5 mm and about 3 mm.

The width (Wr) of the space with respect to a width (Wt) of the lead member may be in the range of about 0.625% to about 12.5%, said relative ratio is Wr/Wt.

The first part of each lead member may include a first weld part that encompasses a portion of the first part, and the second part of each lead member includes a second weld part that encompasses a portion of the second part.

The combined width of the first and second welding parts may be in the range of about 70 mm to about 79.5 mm excluding the width of the space.

The width (Wr) of the space with respect to a width of the first welding part (Wa) and a width of the second welding part (Wb) may be in a range where Wr/(Wa+Wb) is about 0.629% to about 14.286%.

The relative ratio of the width (Wr) of the spacet with respect to a width (Wt) of the lead member may be in the range of about 0.625 to about 3.75%, said relative ratio is Wr/Wt.

The first part and the second part of each lead member may be each welded to the stack of electrode tabs by ultrasonic welding.

The space may include two spaces that forms a first part, a second part and a third part in the first end of each lead member, said first, second and third parts are independent and separate from each other.

The space is at least two separate spaces in each of the lead members and that partially extend longitudinally in each of the lead members to form a first, second and third parts of the lead members.

According to an aspect of the present invention, there is provided a method of manufacturing a secondary battery having an electrode assembly having a plurality of electrode plates and a plurality of separators, a plurality of electrode tabs extending from and electrically connected to each of the plurality of electrode plates, and a plurality of lead members having two ends in which a first end has a space that forms a first part and a second part in the first end of each lead member, that includes: forming a stack of electrode tabs by placing each of the plurality of electrode tabs one directly on another; placing the first end of the lead member on the stack of electrode tabs; placing the stack of electrode tabs on an anvil having a concave-convex surface; placing a horn having a concave-convex surface on the first end of the lead member; and attaching physically the first end to the stack of electrode tabs using the horn and anvil.

The attaching physically the first end to the stack of electrode tabs may be by ultrasonic welding.

The attaching physically the first end to the stack of electrode tabs causes the first end of the lead member to conform to the concave-convex surface of the horn and anvil.

According to one or more embodiments of the present invention, by improving a bond strength between an electrode tab and a lead member and by tightly bonding the electrode tab and the lead member, electrical resistance of charging and discharging paths may be decreased so that charging and discharging efficiencies may be improved.

According to one or more embodiments of the present invention, it is possible to provide a design range of a cutting part that is optimized in consideration of bond strength between an electrode tab and a lead member, and a resistance characteristic of charging and discharging paths.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
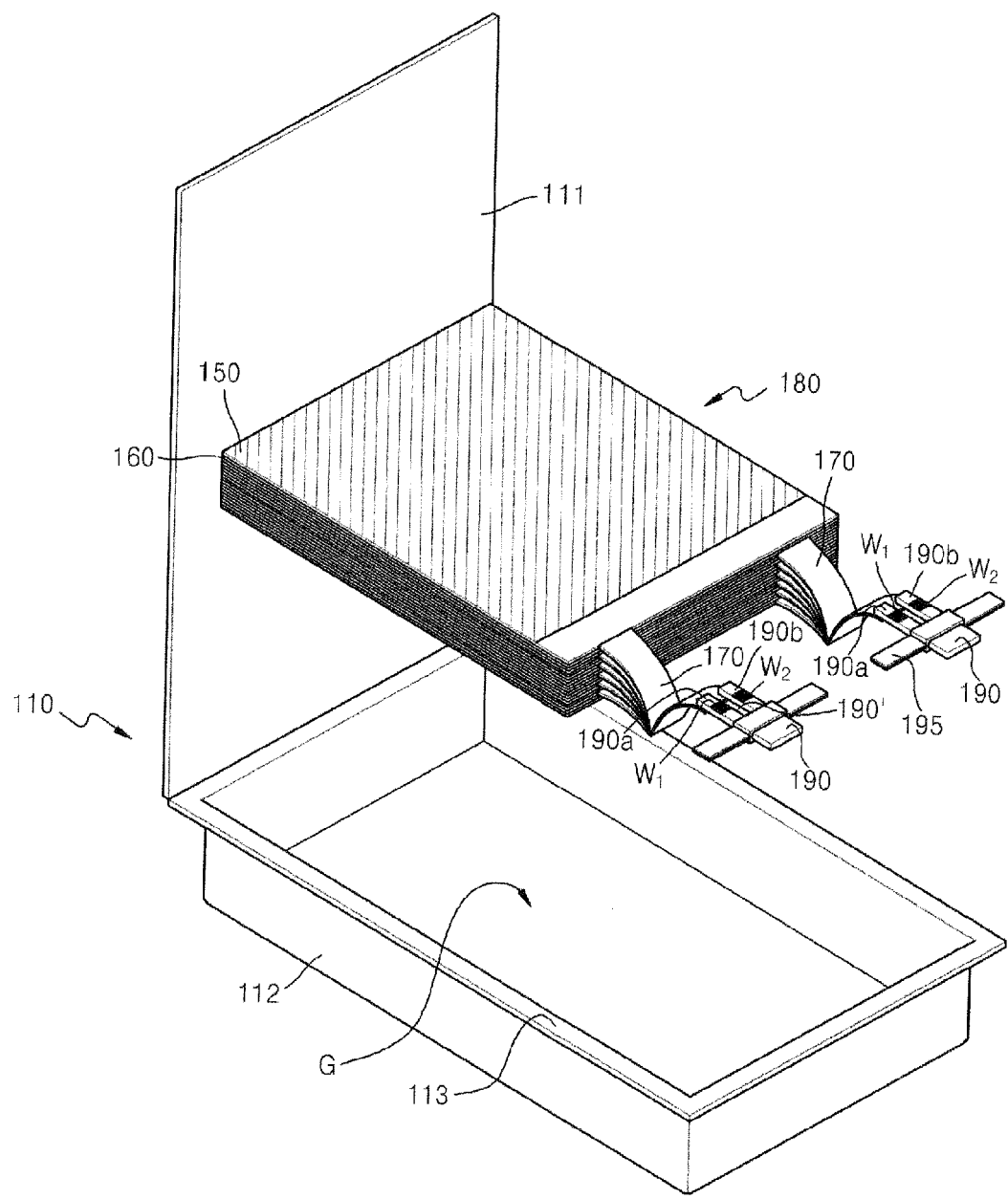
FIG. 1 is an exploded perspective view of a secondary battery according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on another element or be indirectly on the another element with one or more intervening elements interposed therebetween. Also, when an element is referred to as being "connected to" another element, it can be directly connected to another element or be indirectly connected to another element with one or more intervening elements interposed therebetween. Hereinafter, like reference numerals refer to like elements.

Recognizing that sizes and thicknesses of constituent members shown in the accompanying drawings are arbitrarily given for better understanding and ease of description, the present invention is not limited to the illustrated sizes and thicknesses.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Figure 2:
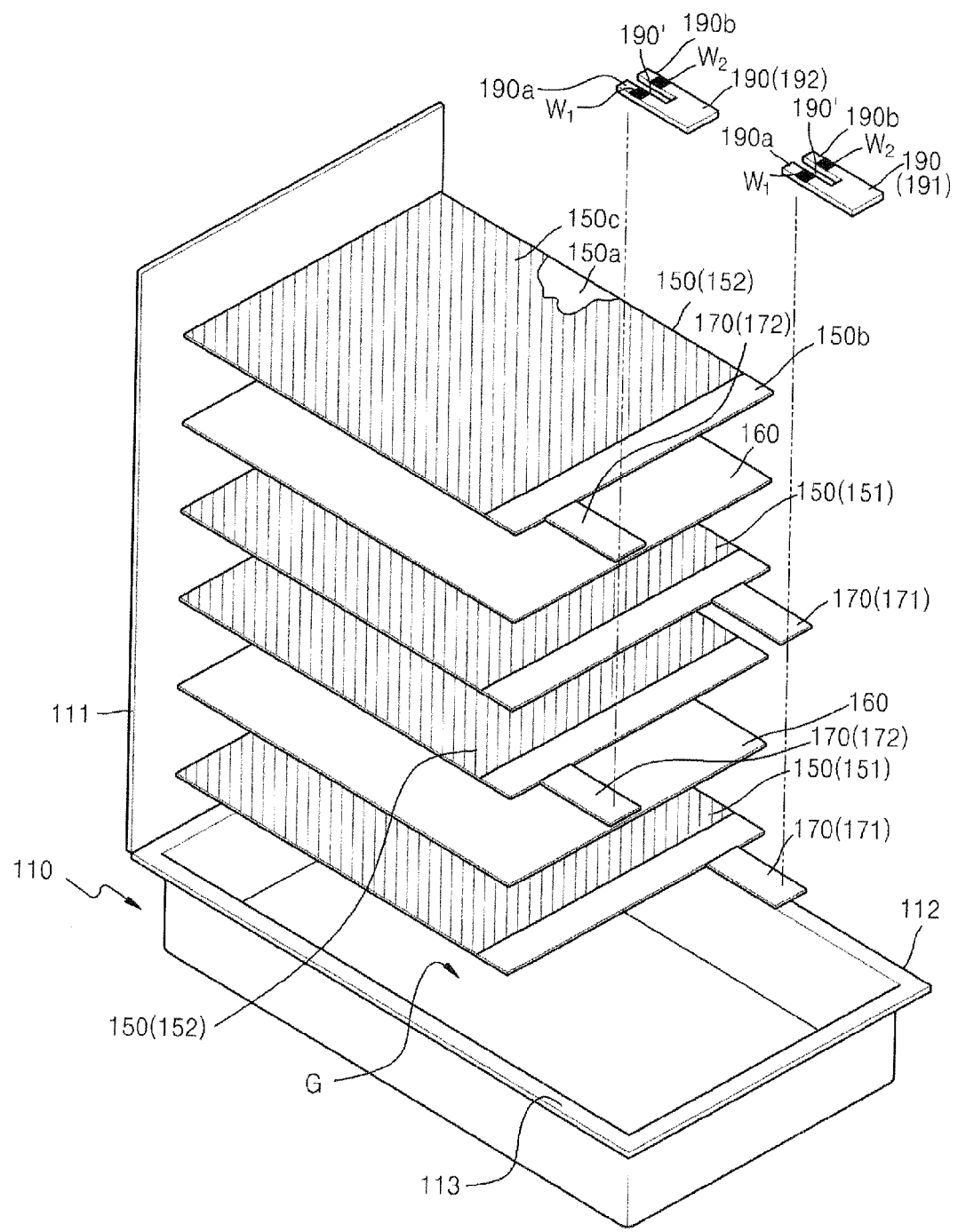
FIG. 2 is another expanded perspective view of the secondary battery of FIG. 1.
Figure 3:
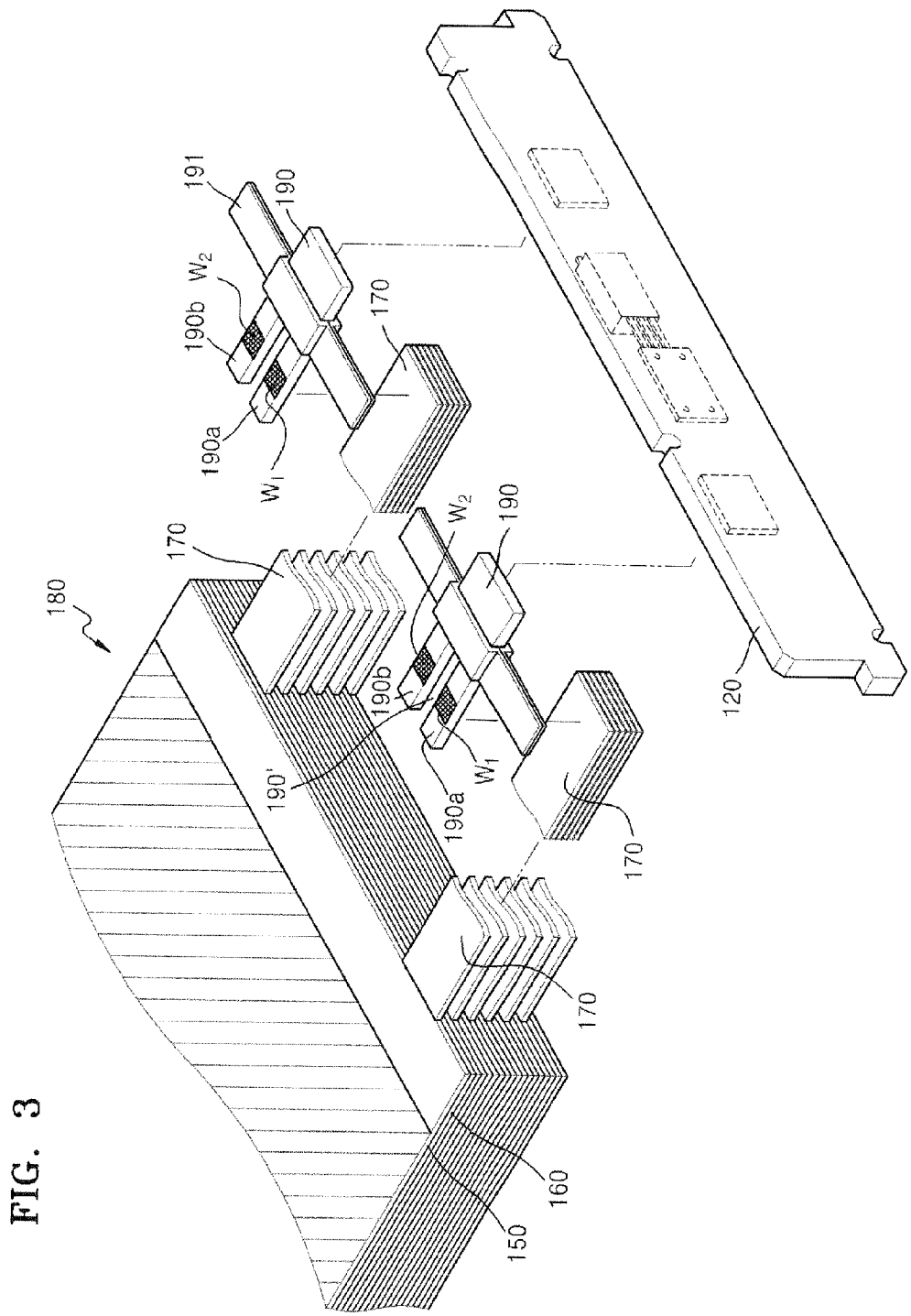
FIG. 3 is an expanded perspective view illustrating a bond status between an electrode tab and a lead member which are illustrated in FIG. 1.

Reference will now be made in detail to embodiments, examples of which are illustrated in the accompanying drawings. FIG. 1 is an exploded perspective view of a secondary battery according to an embodiment of the present invention. FIG. 2 is another expanded perspective view of the secondary battery of FIG. 1. FIG. 3 is an expanded perspective view illustrating a bond status between an electrode tab and a lead member.

Referring to FIGS. 1 through 3, the secondary battery may include an electrode assembly 180, electrode tabs 170 extending from the electrode assembly 180, a lead member 190 electrically connected to the electrode tabs 170, and a case 110 containing the electrode assembly 180.

Referring to FIG. 2, the electrode assembly 180 may include a positive electrode plate 151 and a negative electrode plate 152 sequentially stacked by having a separator 160 interposed therebetween, and may have a stack-type structure in which the positive electrode plate 151, the separator 160, and the negative electrode plate 152, which are cut in a predetermined size and are sequentially stacked. In the electrode assembly 180 having the stack-type structure, a battery capacity may be easily increased by increasing the number of stacks of an electrode plate 150 including the positive electrode plate 151 and the negative electrode plate 152. For example, in order to increase a battery capacity, the electrode assembly 180 may be formed in a manner that a plurality of the positive electrode plates 151 and the negative electrode plates 152 may be stacked, or areas of the positive electrode plate 151 and the negative electrode plate 152 may be enlarged. Throughout the specification, the electrode plate 150 includes the positive electrode plate 151 and the negative electrode plate 152.

The electrode plate 150 may be formed by coating an active material on a surface of an electrode current collector 150a, and may include the electrode current collector 150a and an active material layer 150c formed on at least one surface of the electrode current collector 150a. For example, the positive electrode plate 151 may include a positive electrode current collector 150a and a positive active material layer 150c formed on at least one surface of the positive electrode current collector 150a, and the negative electrode plate 152 may include a negative electrode current collector 150a and a negative active material layer 150c formed on at least one surface of the negative electrode current collector 150a.

An uncoated portion 150b whereon an active material layer is not formed may be formed at a side of the electrode plate 150. For example, a positive electrode uncoated portion 150b may be formed at a side of the positive electrode plate 151, and a negative electrode uncoated portion 150b may be formed at a side of the negative electrode plate 152. The electrode tab 170 may be electrically connected to the uncoated portion 150b, and a positive electrode tab 171 and a negative electrode tab 172 may be electrically and respectively connected to the positive electrode plate 151 and the negative electrode plate 152 via the uncoated portion 150b. Throughout the specification, the electrode tab 170 includes the positive electrode tab 171 and the negative electrode tab 172. For example, the electrode tab 170 may be coupled to the uncoated portion 150b by performing resistance welding, ultrasonic welding, laser welding or the like.

The electrode tab 170 may be formed of a metal material having excellent conductivity. For example, the positive electrode tab 171 may be formed of a metal material including aluminum or nickel, and the negative electrode tab 172 may be formed of a metal material including copper or nickel. The electrode tabs 170, which respectively extend from the electrode plates 150 that are stacked to each other, are overlapped, aggregated, and electrically connected to the lead member 190. For example, the positive electrode tab 171 is electrically connected to a positive electrode lead member 191, and the negative electrode tab 172 is electrically connected to a negative electrode lead member 192. Throughout the specification, the lead member 190 includes the positive electrode lead member 191 and the negative electrode lead member 192.

The electrical connection between the electrode tabs 170 and the lead member 190 may be achieved via welding parts W1 and W2. That is, the electrode tabs 170 extending from the electrode plates 150 are aggregated and integrally coupled with the lead member 190 via the welding parts W1 and W2. The welding parts W1 and W2 may be formed by performing ultrasonic welding. The raw material for the positive electrode tabs 170 and negative electrode tab 170, the positive electrode tab 170 may be formed of aluminum or aluminum based metal, and the negative electrode tab 170 may be formed of copper or copper based metal. Aluminum and copper have quit a low electric resistance, this kind of metal may not be welded by using resistance welding, where the current applied between the two welding base metals to be welded, generate joule heating caused by the resistance of the base metal such that the two base metal could be thermally fused to each other. For example, the ultrasonic welding is performed in a manner that the electrode tabs 170 and the lead member 190, as welding base materials, are disposed while being overlapped with each other, and a vibration energy including a friction heat generated by a high frequency ultrasonic vibration is delivered to the electrode tabs 170 and the lead member 190 that are pressed between a horn (not shown) and an anvil (not shown) of a welding equipment, so that bond is achieved.

The welding parts W1 and W2 between the electrode tabs 170 and the lead member 190 include first and second welding parts W1 and W2. The first and second welding parts W1 and W2 form the welding parts W1 and W2 that are discontinuous to each other. That is, the first and second welding parts W1 and W2 are formed to be spatially separated from each other by a cutting part (also referred to as space) 190' arranged in the lead member 190. The first and second welding parts W1 and W2 that are discontinuous to each other may be formed by performing welding operations having a temporal interval therebetween or may be formed by using separate welding equipments although the first and second welding parts W1 and W2 are simultaneously formed. For example, the first and second welding parts W1 and W2 may be separately formed by performing ultrasonic welding operations having a temporal interval therebetween or may be formed by ultrasonic vibration from separate welding equipments such as different horns (not shown). For example, the electrode tabs 170 and the lead member 190 that are overlapped with each other are sequentially supplied to an ultrasonic welding equipment, and accordingly, the first and second welding parts W1 and W2 may be sequentially formed.

The first and second welding parts W1 and W2 are formed to be spatially separated from each other by the cutting part 190' arranged in the lead member 190. In this manner, by forming the first and second welding parts W1 and W2 that are discontinuous to each other, a vibration energy may be locally concentrated on each of the first and second welding parts W1 and W2, so that the first and second welding parts W1 and W2 may achieve a great welding strength due to a sufficient vibration energy. In particular, in a large capacity battery, it is necessary for the lead member 190 to have a large area so as to extract a high current.

In a case where a single welding part is formed on the lead member 190 having the large area by performing welding once, a pressure and a vibration energy provided between a horn (not shown) and an anvil (not shown) are diffused on a large area of a welding base material and are not locally concentrated on a small area, such that bond is not sufficiently achieved, and a necessary welding strength may not be obtained.

However, when the lead member 190 is separated and then sequentially welded, a sufficient welding strength may be obtained from the lead member 190 having the large area. In particular, by having the cutting part 190' arranged in the lead member 190, the lead member 190 may be separated into independent small members, and vibration propagation between the small members may be reduced or refrained. For example, in the first and second welding parts W1 and W2, a welding operation performed on one of the first and second welding parts W1 and W2 may not affect a welding condition or a welded status of the other one of the first and second welding parts W1 and W2.

For example, when the second welding part W2 is welded after the first welding part W1 is welded, if the first and second welding parts W1 and W2 have a physically continuous connection, a bond status of the first welding part W1 that is already welded may be damaged by vibration of the second welding part W2. Also, if the vibration of the second welding part W2 is restricted due to a physical interference of the first welding part W1, a bond status of the second welding part W2 may deteriorate. Thus, by having the cutting part 190' arranged between the first and second welding parts W1 and W2, when ultrasonic welding accompanying a mechanical vibration is performed, a physical interference or restriction between the first and second welding parts W1 and W2 may be reduced, and a welding strength may be improved.

Referring to FIG. 1, the case 110 functions to provide a space G for containing the electrode assembly 180 and to insulate and protect the electrode assembly 180 from an external environment. The case 110 may include an exterior panel formed by laminating a resin sheet on both surfaces of a thin metal. For example, the case 110 may include an aluminum laminated sheet.

The case 110 may include first upper and second lower cases 111 and 112 forming the space G for containing the electrode assembly 180. The first upper and second lower cases 111 and 112 may be bonded to each other by having the electrode assembly 180 contained therebetween, so that the electrode assembly 180 may be encapsulated. In more detail, bond surfaces 113 of the first upper and second lower cases 111 and 112 which face each other are thermally bonded so that the electrode assembly 180 in the first upper and second lower cases 111 and 112 may be encapsulated.

When the first upper and second lower cases 111 and 112 are bonded, at least a part of the lead member 190 is exposed. For example, the lead member 190 may be exposed between the bond surfaces 113 of the first upper and second lower cases 111 and 112. Here, the lead member 190 may form an insulation contact with the case 110, and in order to achieve an insulation status and to increase an encapsulation level with the case 110, an insulating film 195 may be attached on a contact part of the lead member 190 which contacts the case 110. The insulation film 195 is disposed at the contact point with the case 110. In this regard, the insulation film 195 may divide the lead member 190 into inner portion 191 and outer portion 192 as further discussed in reference to FIG. 6, and coupling points (i.e. first and second welding parts W1 and W2) is formed at the inner portion 191. For example, the insulating film 195 may be wrapped around the contact part of the lead member 190.

First and second parts 190a and 190b are individualized by forming the cutting part 190' in the lead member 190, and the first and second welding parts (coupling points) W1 and W2 are formed by sequentially performing ultrasonic welding on the first and second parts 190a and 190b, so that a bond strength of the welding parts W1 and W2 may be improved. In more detail, in a case where the lead member 190 is not individualized but an integrated single bonding part is formed, a bonding strength of between about 15 and about 17 kgf/cm$^2$ is obtained. However, as illustrated in FIGS. 1 and 2, in a case where the lead member 190 is individualized and the welding parts W1 and W2 are formed, a bonding strength of between about 19 and about 20.8 kgf/cm$^2$ is obtained, thus, the bonding strength is improved by about 15 through 20%.

The improvement of the bonding strength between the electrode tabs 170 and the lead member 190 means that the electrode tabs 170 and the lead member 190 mutually form tight bond, so that electrical resistance of charging and discharging paths is decreased. For example, when the electrode tabs 170 and the lead member 190 are not tightly bonded, and a certain portion of the welding parts W1 and W2 is loose, electrical resistance of the certain portion is increased.

In order to evaluate charging and discharging characteristics, the present embodiment and a comparative example are compared, wherein a principle of the present invention is applied to the present embodiment so that the present embodiment have the first and second welding parts W1 and W2 that are discontinuous to each other, and the comparative example has a single bonding part on a lead member. The present embodiment and the comparative example are fully charged at a charging speed of 5 C, and their charge capacities are measured. With respect to charge capacities at a charging speed of 1 C, the charge capacity of about 95% is measured in the present embodiment, and the charge capacity of about 93% is measured in the comparative example. The charge capacity of the present embodiment is further highly measured, and this means that charging and discharging efficiencies of the present embodiment are improved, compared to those of the comparative example.

Figure 4:
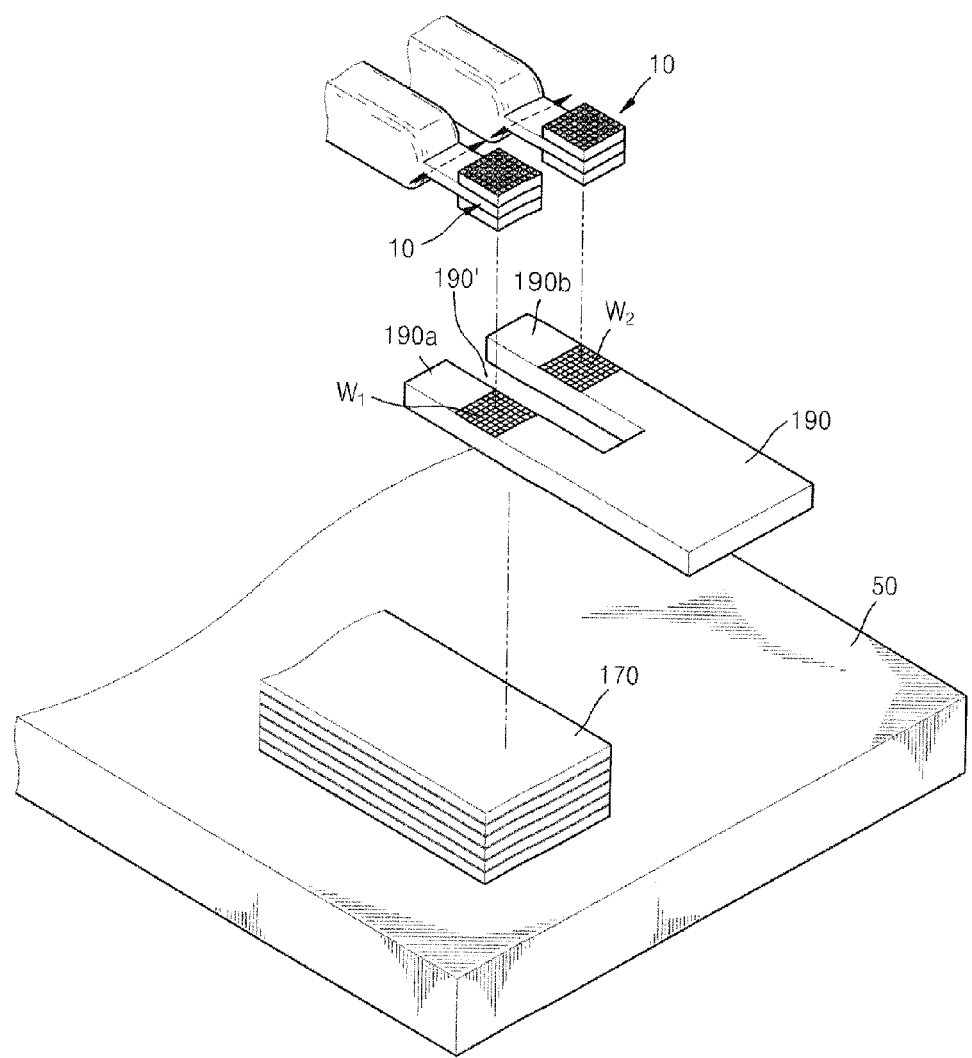
FIG. 4 is a diagram illustrating an ultrasonic welding process performed between the electrode tab and the lead member.

FIG. 4 is a diagram illustrating an ultrasonic welding process performed between the electrode tab 170 and the lead member 190. Referring to FIG. 4, in the ultrasonic welding process, as welding base materials, the electrode tab 170 and the lead member 190 are interposed between a horn 10 having a concave-convex surface formed thereon and an anvil 50 having a concave-convex surface formed thereon so as to correspond to the concave-convex surface of the horn 10, and ultrasonic vibration is applied to the welding base materials 170 and 190 while the welding base materials 170 and 190 are pressed between the horn 10 and the anvil 50.

Here, the first and second parts 190*a* and 190*b* that are individualized by the cutting part 190' may not be affected by the ultrasonic vibration applied to the other part and may not interfere with each other in the ultrasonic welding process accompanying a mechanical vibration. The first and second parts 190*a* and 190*b* that are individualized by the cutting part 190' may be welded to the electrode tab 170 by performing separate ultrasonic welding operations. For example, after first ultrasonic welding is performed between the electrode tabs 170 and the first part 190*a* of the lead member 190, second ultrasonic welding may be performed between the electrode tabs 170 and the second part 190*b* of the lead member 190. In particular, for a large capacity battery, the electrode tabs 170 and the lead member 190 may be enlarged, and in order to bond the enlarged electrode tabs 170 and the enlarged lead member 190 with a high welding strength, a welding vibration may be concentrated on a local area of each of the first and second parts 190*a* and 190*b* during the ultrasonic welding.

Figure 5A:
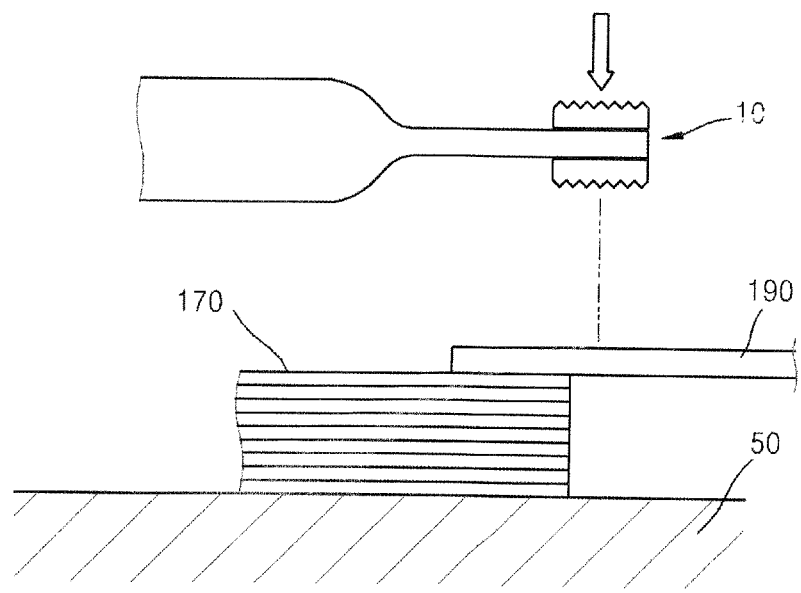
FIGS. 5A through 5C illustrate various dispositions between the electrode tabs and the lead member.
Figure 5B:
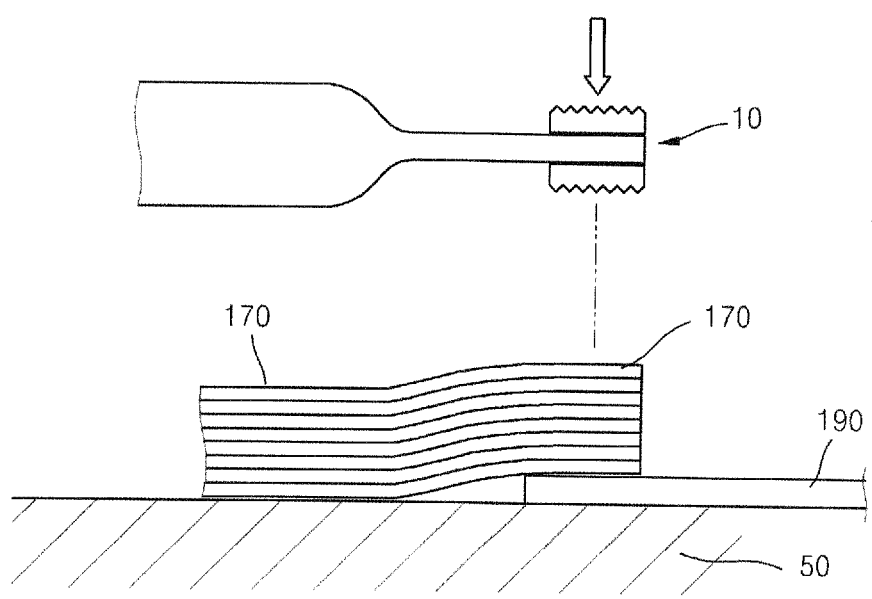
Figure 5C:
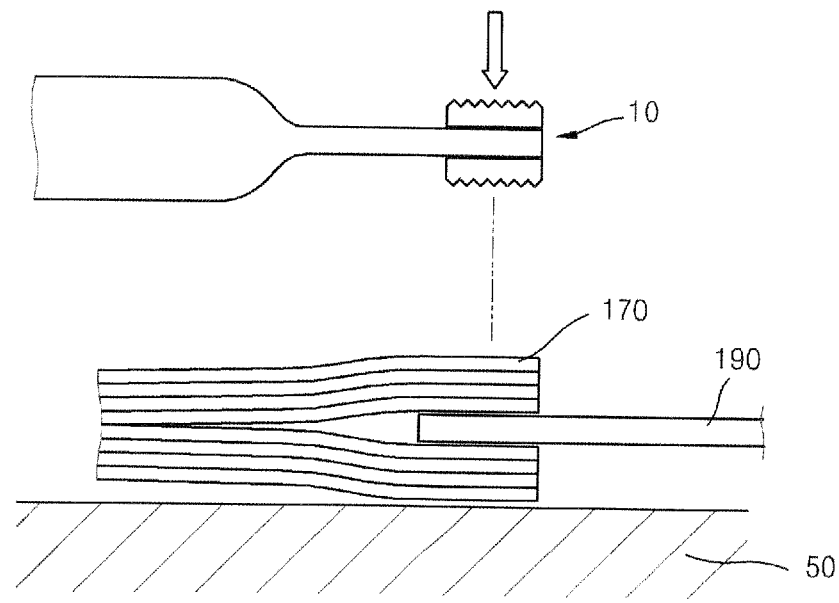

FIGS. 5A through 5C illustrate various dispositions between the electrode tabs 170 and the lead member 190. As illustrated in FIG. 5A, after the lead member 190 is arranged on a top surface of the top electrode tab 170, the lead member 190 and the electrode tabs 170 are interposed between a horn 10 and an anvil 50 of an ultrasonic welding equipment, and then ultrasonic welding may be performed thereon.

As illustrated in FIG. 5B, after the lead member 190 is arranged under a bottom surface of the bottom electrode tab 170, the lead member 190 and the electrode tabs 170 are interposed between a horn 10 and an anvil 50 of an ultrasonic welding equipment, and then ultrasonic welding may be performed thereon.

As illustrated in FIG. 5C, the lead member 190 may be inserted into a middle position between the electrode tabs 170, and after the lead member 190 is arranged between the electrode tabs 170, the lead member 190 and the electrode tabs 170 are interposed between a horn 10 and an anvil 50 of an ultrasonic welding equipment, and then ultrasonic welding may be performed thereon.

Figure 6:
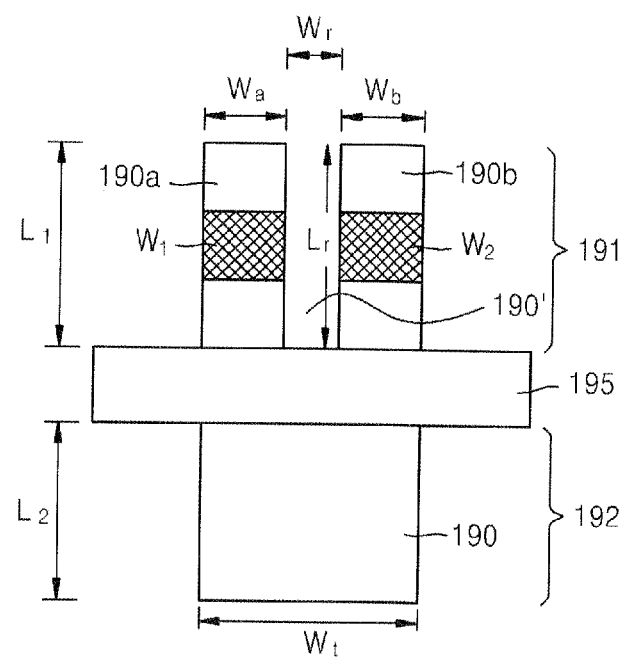
FIG. 6 illustrates a structure of the lead member, according to an embodiment of the present invention.

FIG. 6 illustrates a structure of the lead member 190, according to an embodiment of the present invention. In the present embodiment, the lead member 190 is separated so as to strengthen bond between the electrode tab 170 and the lead member 190. That is, as illustrated in FIG. 6, a cutting part 190' is formed at a center position in a horizontal direction of the lead member 190, and the lead member 190 is separated into first and second parts 190*a* and 190*b* by having a gap therebetween by the cutting part 190'.

The lead member 190 is projected from the electrode assembly 180 in the case 110 toward the outside of the case 110, and may include an inner side portion 191 accepted in the case 110, and an outer side portion 192 externally projected from the case 110. For example, an insulating film 195 may be attached on a contact part of the lead member 190 which contacts the case 110, and with respect to the insulating film 195, the lead member 190 may be divided into the inner side portion 191 forming welding parts W1 and W2 with the electrode tab 170, and the outer side portion 192 externally projected from the case 110.

The inner side portion 191 of the lead member 190 may be overlapped with the electrode tab 170 and may form the welding parts W1 and W2 with the electrode tab 170. The outer side portion 192 of the lead member 190 may be electrically connected to a circuit board 120 (refer to FIG. 3) disposed outside the case 110 and may form a contact with the circuit board 120.

The cutting part 190' may extend in a vertical direction of the lead member 190, and may not be formed to correspond to a total length of the lead member 190 but may be formed to correspond to a partial length of the lead member 190. For example, the cutting part 190' extends along the inner side portion 191 while separating the inner side portion 191 into the first and second parts 190*a* and 190*b*, and does not extend toward the outer side portion 192. That is, the cutting part 190' is formed only in the inner side portion 191, and the cutting part 190' extending from an end of the inner side portion 191 may stop at the contact part whereon the insulating film 195 is attached and which is at a boundary between the inner side portion 191 and the outer side portion 192. In other words, an extension length Lr of the cutting part 190' may be set from the end of the inner side portion 191 to the boundary between the inner side portion 191 and the outer side portion 192.

The cutting part 190' functions to physically separate the first and second parts 190*a* and 190*b* so as to significantly reduce mutual interference during welding. Thus, as long as the function is achieved, the extension length Lr of the cutting part 190' is not limited thereto. That is, if necessary, the cutting part 190' may not extend to the boundary between the inner side portion 191 and the outer side portion 192, or may exceed the boundary and extend to the outer side portion 192. That is, in consideration of amplitude of an ultrasonic vibration that is horizontally applied to a flat surface of the lead member 190, the extension length Lr may have a value sufficient to avoid mutual interference with respect to the first and second parts 190*a* and 190*b*.

For example, in a case where the amplitude of the ultrasonic vibration is relatively great, the extension length Lr of the cutting part 190' may be relatively long, and in a case where the amplitude of the ultrasonic vibration is relatively small, the extension length Lr of the cutting part 190' may be relatively short. This is because movement of the first and second parts 190*a* and 190*b* is relatively free as the extension length Lr of the cutting part 190' is formed to be long, whereas the movement of the first and second parts 190*a* and 190*b* is relatively limited as the extension length Lr of the cutting part 190' is formed to be short.

As described above, the extension length Lr of the cutting part 190' may be set so as to avoid mutual interference, in consideration of the amplitude of the ultrasonic vibration. However, in consideration of connection with the circuit board 120 disposed outside the case 110, an end of the outer side portion 192 of the lead member 190 may not be open by the cutting part 190'. That is, by integrally forming the outer side portion 192 of the lead member 190, electrical resistance at the contact with the circuit board 120 may be reduced, and by forming the cutting part 190' in the inner side portion 191 of the lead member 190, the lead member 190 is individualized into the first and second parts 190*a* and 190*b*, and mechanical interference does not occur during welding.

The cutting part 190' may have an elongated slit shape extending with a constant width Wr, and may have a rectangular slit shape whose one side is open. The first and second parts 190*a* and 190*b* that are individualized by the cutting part 190' may avoid physical interference to each other while welding is performed on the first and second parts 190*a* and 190*b* and the electrode tab 170. For example, the electrode tab 170 and the lead member 190 may be integrally bonded by performing ultrasonic welding.

The first and second parts 190*a* and 190*b* may have a first width Wa and a second width Wb, respectively. The first and second parts 190*a* and 190*b* are overlapped with the electrode tab 170, and form the welding parts W1 and W2 with the electrode tab 170, so that a total sum of the first width Wa and the second width Wb may correspond to a width of the welding parts W1 and W2.

The first and second parts 190*a* and 190*b* may have the same width (that is, Wa=Wb). By forming the first and second parts 190*a* and 190*b* so as to have the same width, the ultrasonic welding may be performed on optimized sizes, and a uniform bond strength may be achieved without variation in a bond strength. That is, the variation in the bond strength which occurs when a bond strength of any one of the first and second parts 190*a* and 190*b* is insufficient may be removed, and the bond strength may be strengthened. Also, by separating the lead member 190 into the first and second parts 190*a* and 190*b* having the same widths Wa and Wb, a welding load may not be emphasized to any one of the first and second parts 190*a* and 190*b* but may be uniformly applied to all parts.

The width Wr of the cutting part 190' may be between about 0.5 mm and about 10 mm.

The lowest value of 0.5 mm is set in consideration of a machining error with respect to the cutting part 190'. The cutting part 190' may be formed by cutting and removing a portion of the lead member 190. When the cutting part 190' is formed, the machining error may occur as in a common manufacturing process, so that it is necessary to consider the machining error in a design of the cutting part 190'.

In a case where the cutting part 190' has a width less than the lowest value of 0.5 mm, due to the machining error, the first and second parts 190*a* and 190*b* may not be spatially separated and individualized but may have remaining connection therebetween such that the first and second parts 190*a* and 190*b* may communicate with each other. This means that an ultrasonic vibration applied to any one of the first and second parts 190*a* and 190*b* may affect the other one of the first and second parts 190*a* and 190*b*.

For example, in the first and second parts 190*a* and 190*b*, the one that is already welded may be vibrated due to an ultrasonic vibration applied to the other one, such that a bonding status of the one may be damaged. Also, a vibration condition for welding may be randomly changed due to mechanical interference by the one that is already welded, such that process parameters of the ultrasonic vibration including a frequency or amplitude may not be appropriately controlled, and as a result, the bond strength of the welding parts W1 and W2 may deteriorate. In the ultrasonic welding, a high frequency ultrasonic vibration is necessary to provide a sufficient friction heat between the electrode tab 170 and the lead member 190 which are to be bonded, so that the bond strength may deteriorate in an environment in which the vibration condition is not controlled. Thus, by forming the cutting part 190' so as to have the sufficient width Wr, in consideration of the machining error, it is possible to assure a space sufficient to prevent the mechanical interference in the first and second parts 190*a* and 190*b*.

In a case where the width Wr of the cutting part 190' exceeds the greatest value of 10 mm and is formed to have a width greater than the greatest value of 10 mm, the first width Wa and the second width Wb that provide paths for charging and discharging current may be decreased accordingly, so that electrical resistance is increased, and charging and discharging efficiencies deteriorate. That is, the lead member 190 forms a current path for externally extracting discharging current that is supplied from the electrode assembly 180, and the discharging current is externally supplied via the first and second parts 190*a* and 190*b* of the lead member 190. Also, the lead member 190 forms a current path for internally supplying charging current that is supplied to the electrode assembly 180, and the charging current is supplied to the electrode assembly 180 via the first and second parts 190*a* and 190*b* of the lead member 190.

When the width Wr of the cutting part 190' is formed to have the width greater than the greatest value 10 mm, a proportion of a width of the lead member 190 which is occupied by the cutting part 190' is increased, and as a result, the first and second widths Wa and Wb of the first and second parts 190*a* and 190*b* are relatively decreased, so that cross-sectional areas forming the charging and discharging paths are reduced. Thus, it is necessary to form the width Wr of the cutting part 190' so as to satisfy a range sufficient to separate the first and second parts 190*a* and 190*b* and not to exceed the greatest value of 10 mm.

In order to provide a useful design range, the present embodiment uses a dimensionless design parameter Wr/Wt that is the width Wr of the cutting part 190' with respect to a width Wt of the lead member 190. When the width Wt of the lead member 190 is about 80 mm, the width Wr of the cutting part 190' with respect to the width Wt of the lead member 190, that is, a relative ratio Wr/Wt is in the range of about 0.625 to about 12.5%.

The first and second widths Wa and Wb are overlapped with the electrode tab 170, and correspond to widths of the welding parts W1 and W2 that are bonded with the electrode tab 170. When the width Wt of the lead member 190 is about 80 mm, a total sum (Wa+Wb) obtained by adding the first and second widths Wa and Wb of the welding parts W1 and W2 is in the range of about 70 mm to about 79.5 mm, except for the width Wr of the cutting part 190' which is between about 0.5 mm and about 10 mm.

In order to provide a useful design range, the present embodiment uses a dimensionless design parameter Wr/(Wa+Wb) that is the width Wr of the cutting part 190' with respect to the width (Wa+Wb) of the welding parts W1 and W2. According to this, the design parameter Wr/(Wa+Wb) is in the range of about 0.629 to about 14.286%.

According to another embodiment, a relative width ratio (Wr/Wa or Wr/Wb) of a width Wa or Wb of each of the individualized first and second parts 190*a* and 190*b* to the width Wr of the cutting part 190' is in the range of about 0.315 to about 7.143%. When the first and second parts 190*a* and 190*b* are formed to have the same widths Wa and Wb, the width Wa or Wb of each of the individualized first and second parts 190*a* and 190*b* may be obtained by equally dividing a total width of the welding parts W1 and W2 in half. By equally dividing the first and second parts 190*a* and 190*b* into the same widths Wa and Wb, a uniform bond strength may be achieved without variation in a bond strength, and the first and second parts 190*a* and 190*b* may be welded according to a same optimized welding condition.

As described above, the width Wr of the cutting part 190' may be designed to be between about 0.5 mm and about 10 mm, more particularly, the width Wr of the cutting part 190' may be designed to be between about 0.5 mm and about 3 mm. The lowest value of 0.5 mm is aimed in consideration of the machining error in the manufacturing process of the cutting part 190', so that the first and second parts 190*a* and 190*b* are separated, and an ultrasonic vibration applied to any one of the first and second parts 190*a* and 190*b* is insulated from the other one of the first and second parts 190*a* and 190*b*. The greatest value of 3 mm is aimed to limit the width Wr of the cutting part 190', so that the first and second widths Wa and Wb of the first and second parts 190*a* and 190*b* that substantially form charging and discharging current paths may be maintained at an appropriate level.

When the width Wr of the cutting part 190' is between about 0.5 mm and about 3 mm, and the width Wt of the lead member 190 is about 80 mm, a relative ratio Wr/Wt that is the width Wr of the cutting part 190' with respect to the width Wt of the lead member 190 is in the range of about 0.625 to about 3.75%.

The first and second widths Wa and Wb are overlapped with the electrode tab 170, and form the welding parts W1 and W2 with the electrode tab 170, so that the total sum (Wa+Wb) of the first and second widths Wa and Wb corresponds to widths of the welding parts W1 and W2. When the width Wt of the lead member 190 is about 80 mm, the total sum (Wa+Wb) of the welding parts W1 and W2 is in the range of about 77 mm to about 79.5 mm, except for the width Wr of the cutting part 190' that is between about 0.5 mm and about 3 mm. Here, the width Wr of the cutting part 190' with respect to the width (Wa+Wb) of the welding parts W1 and W2, that is, Wr/(Wa+Wb) is in the range of about 0.629 to about 3.896%.

Also, the relative width ratio (Wr/Wa or Wr/Wb) of the width Wr of the cutting part 190' to the first width Wa or the second width Wb of the individualized first part 190*a* or the individualized second part 190*b* is in the range of about 0.315 to about 1.948%. This is because, when the first and second parts 190*a* and 190*b* are formed to have the same widths Wa and Wb, the first width Wa or the second width Wb of the individualized first part 190*a* or the individualized second part 190*b* may be obtained by equally dividing the total width of the welding parts W1 and W2 in half.

According to another embodiment, the width Wr of the cutting part 190' may be designed to be between about 2 mm and about 3 mm. The lowest value of 2 mm is aimed in consideration of the machining error in the manufacturing process of the cutting part 190', and in addition to this, the first and second parts 190*a* and 190*b* that are divided by the cutting part 190' are physically separated from each other by having a sufficient space therebetween, so that any one of the first and second parts 190*a* and 190*b* may not be affected by the other one of the first and second parts 190*a* and 190*b* while the other one is welded.

The greatest value of 3 mm is aimed to limit the width Wr of the cutting part 190', so that the first and second widths Wa and Wb of the first and second parts 190*a* and 190*b* that substantially form charging and discharging current paths may be maintained at an appropriate level, and electrical resistance of the current paths may be reduced.

When the width Wr of the cutting part 190' is between about 2 mm and about 3 mm, and the width Wt of the lead member 190 is about 80 mm, a relative ratio Wr/Wt that is the width Wr of the cutting part 190' with respect to the width Wt of the lead member 190 is in the range of about 2.5 to about 3.75%.

The first and second widths Wa and Wb are overlapped with the electrode tab 170, and form the welding parts W1 and W2 with the electrode tab 170, so that the total sum (Wa+Wb) of the first and second widths Wa and Wb corresponds to widths of the welding parts W1 and W2. When the width Wt of the lead member 190 is about 80 mm, the total sum (Wa+Wb) of the welding parts W1 and W2 is in the range of about 77 mm to about 78 mm, except for the width Wr of the cutting part 190' that is between about 2 mm and about 3 mm. Here, the width Wr of the cutting part 190' with respect to the width (Wa+Wb) of the welding parts W1 and W2, that is, Wr/(Wa+Wb) is in the range of about 2.564 to about 3.896%.

Also, the relative width ratio (Wr/Wa or Wr/Wb) of the width Wr of the cutting part 190' to the first width Wa or the second width Wb of the individualized first part 190*a* or the individualized second part 190*b* is in the range of about 1.282 to about 1.948%. This is because, when the first and second parts 190*a* and 190*b* are formed to have the same widths Wa and Wb, the first width Wa or the second width Wb of the individualized first part 190*a* or the individualized second part 190*b* may be obtained by equally dividing the total width of the welding parts W1 and W2 in half.

In the present embodiment of FIG. 6, the lead member 190 is separated into the first and second parts 190*a* and 190*b* by using one cutting part 190' but the number of the cutting part 190' is not limited thereto. That is, at least two cutting parts 190' may be formed in the lead member 190, so that the lead member 190 may be separated into first through $n_{th}$ parts.

In FIG. 6, reference numerals L1 and L2 respectively indicate a length of the inner side portion 191 and a length of the outer side portion 192 of the lead member 190.

Figure 7:
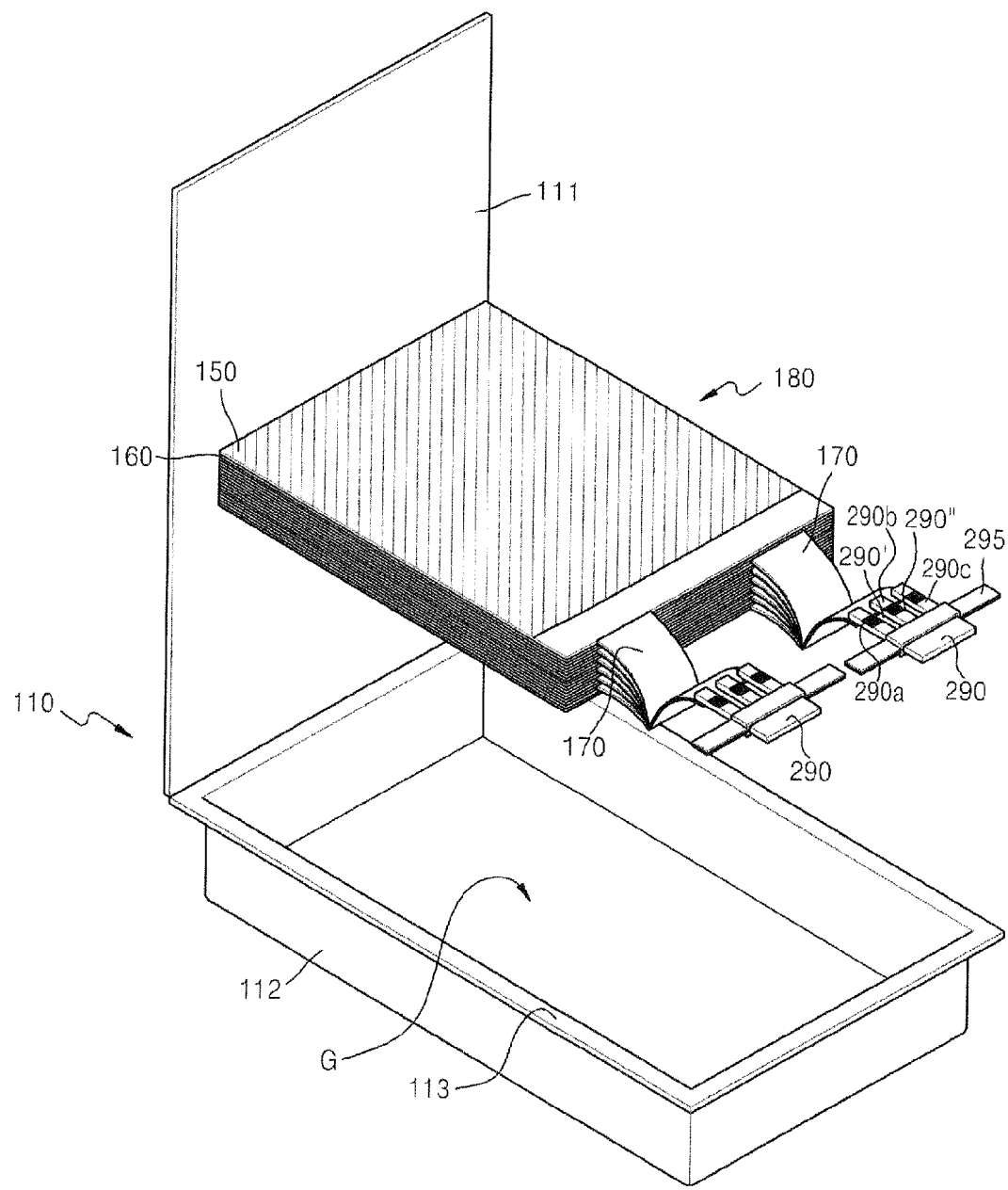
FIG. 7 is an exploded perspective view of a secondary battery according to another embodiment of the present invention.
Figure 8:
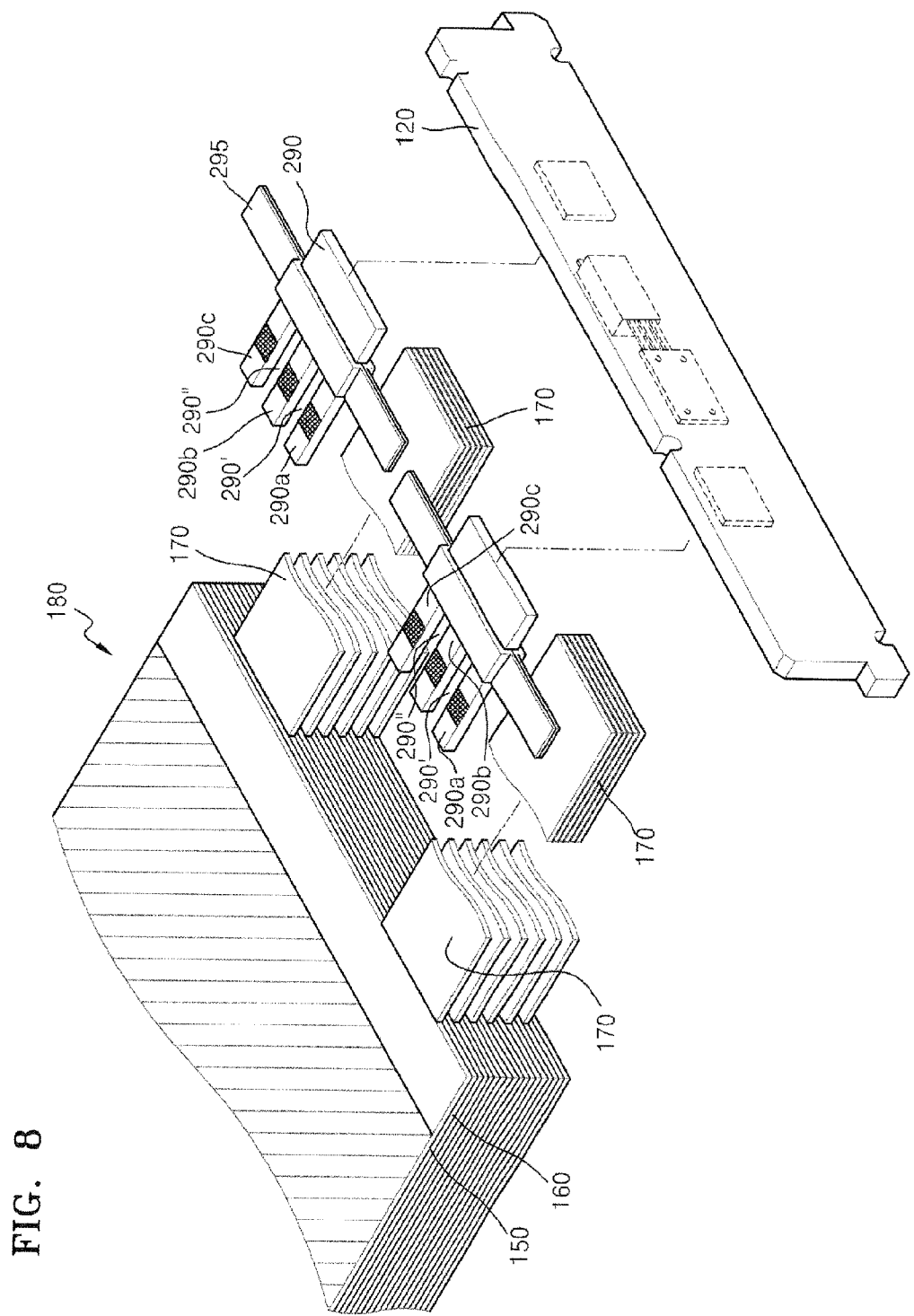
FIG. 8 is a perspective view illustrating a bond status between an electrode tab and a lead member in FIG. 7.

FIG. 7 is an exploded perspective view of a secondary battery according to another embodiment of the present invention. FIG. 8 is a perspective view illustrating a bond status between an electrode tab 170 and a lead member 290 in FIG. 7.

Referring to FIGS. 7 and 8, first and second cutting parts 290' and 290" are formed in the lead member 290. The first and second cutting parts 290' and 290" may be formed along a longitudinal direction extending from an electrode assembly 180 and projecting from a case 110.

In the present embodiment, at least two cutting parts 290' and 290" are formed in the lead member 290. In particular, in order to process a large amount of charging and discharging current according to a battery capacity, the electrode tab 170 and the lead member 290 may be enlarged. Afterward, the enlarged lead member 290 may be divided into a plurality of small areas, and an ultrasonic vibration may be locally concentrated on each of the divided small areas by performing welding thereon. For this, the lead member 290 may be individualized into a plurality of parts by at least two cutting parts 290' and 290". For example, referring to FIGS. 7 and 8, the lead member 290 may be individualized into first, second, and third parts 290*a*, 290*b*, and 290*c* by the first and second cutting parts 290' and 290".

Figure 9:
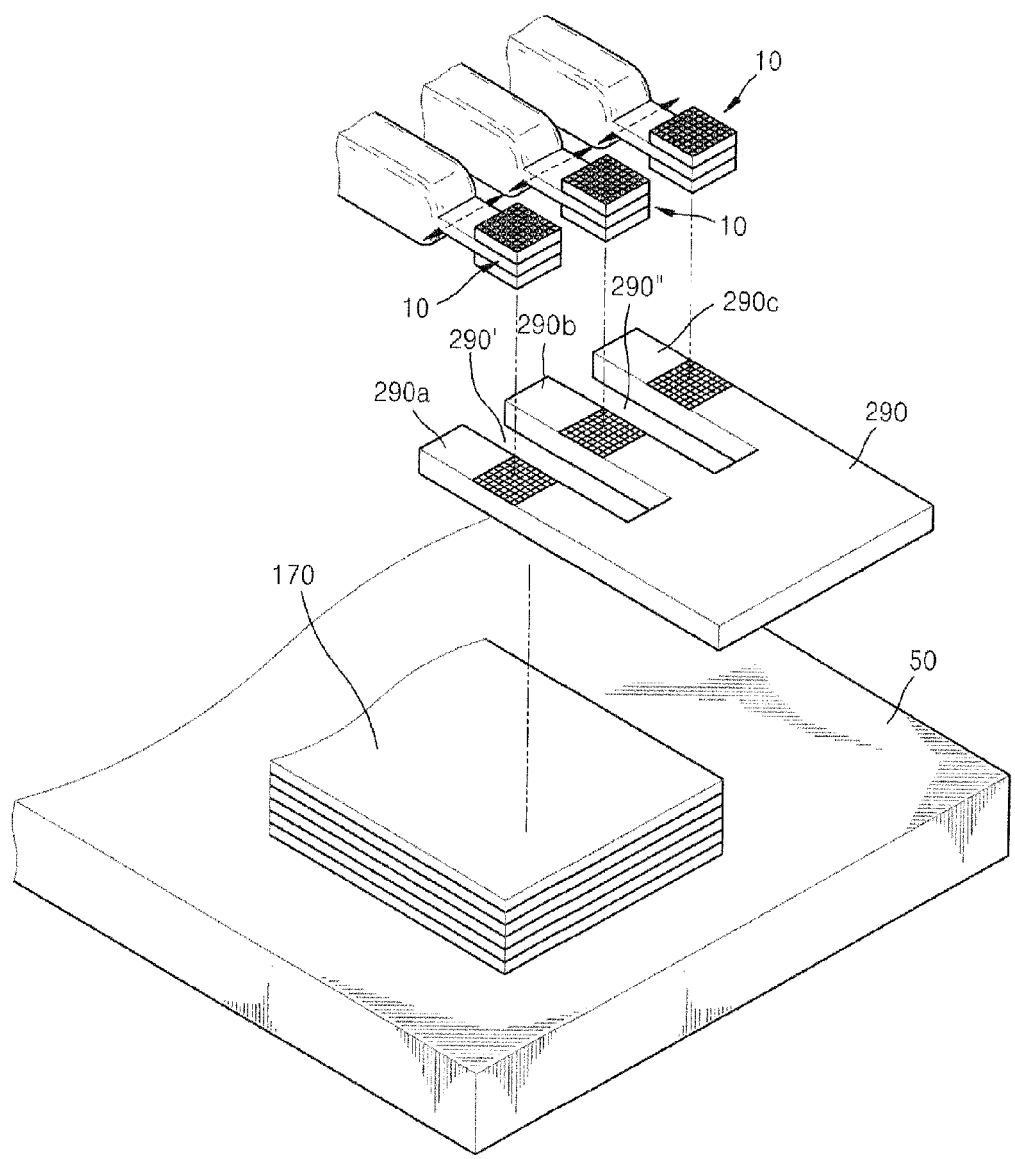
FIG. 9 is a perspective view illustrating an ultrasonic welding process performed between the electrode tab and the lead member.

FIG. 9 is a diagram illustrating an ultrasonic welding process performed between the electrode tab 170 and the lead member 290. Referring to FIG. 9, in the ultrasonic welding process, as welding base materials, the electrode tab 170 and the lead member 290 are interposed between a horn 10 having a concave-convex surface formed thereon and an anvil 50 having a concave-convex surface formed thereon so as to correspond to the concave-convex surface of the horn 10, and ultrasonic vibration is applied to the welding base materials 170 and 290 while the welding base materials 170 and 290 are pressed between the horn 10 and the anvil 50.

Here, the first, second, and third parts 290*a*, 290*b*, and 290*c* that are individualized by the first and second cutting parts 290' and 290" may not be affected by the ultrasonic vibration applied to the other part and may not interfere with each other in the ultrasonic welding process accompanying a mechanical vibration. The first, second, and third parts 290*a*, 290*b*, and 290*c* that are individualized by the first and second cutting parts 290' and 290" may be welded to the electrode tab 170 by performing separate ultrasonic welding operations. For example, after first ultrasonic welding is performed between the electrode tabs 170 and the first part 290*a* of the lead member 290, second ultrasonic welding may be performed between the electrode tabs 170 and the second part 290*b* of the lead member 290. Afterward, third ultrasonic welding may be performed between the electrode tabs 170 and the third part 290*c* of the lead member 290.

In a large capacity battery, the electrode tabs 170 and the lead member 290 may be enlarged, and in order to bond the enlarged electrode tabs 170 and the enlarged lead member 290 with a high welding strength, a welding vibration may be concentrated on a local area of each of the first, second, and third parts 290a, 290b, and 290c by performing the ultrasonic welding several times.

Figure 10:
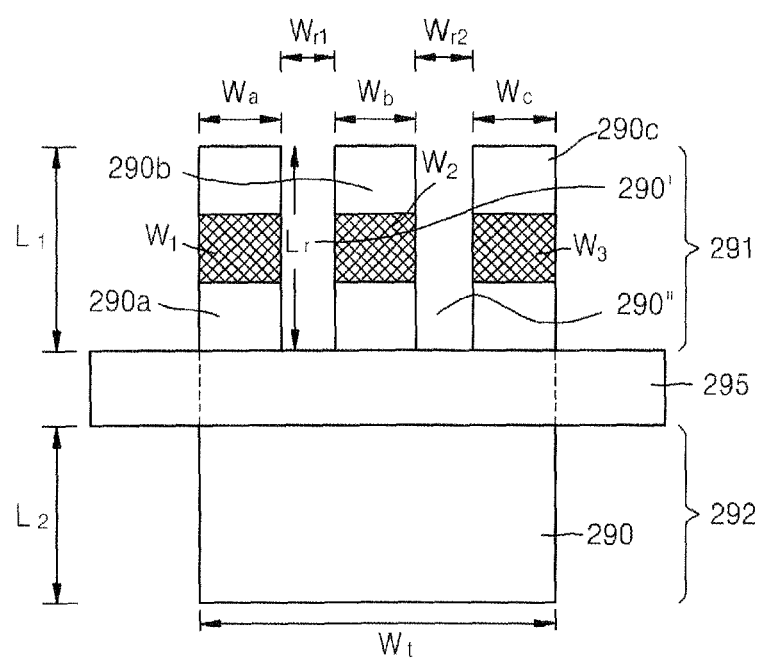
FIG. 10 illustrates a structure of the lead member, according to another embodiment of the present invention.

FIG. 10 illustrates a structure of the lead member 290. Referring to FIG. 10, the first and second cutting parts 290' and 290" may extend in a vertical direction of the lead member 290, and may not be formed to correspond to a total length of the lead member 290 but may be formed to correspond to a partial length of the lead member 290. For example, the lead member 290 may include an inner side portion 291 accepted in the case 110, and an outer side portion 292 externally projected from the case 110.

The inner side portion 291 of the lead member 290 may be overlapped with the electrode tab 170 and may form welding parts W1, W2, and W3 with the electrode tab 170. The outer side portion 292 of the lead member 290 may be electrically connected to a circuit board 120 (refer to FIG. 8) disposed outside the case 110 and may form a contact with the circuit board 120.

For example, the first and second cutting parts 290' and 290" may be formed only in the inner side portion 291 of the lead member 290, may extend along the inner side portion 291, and may divide the inner side portion 291 into the first, second, and third parts 290a, 290b, and 290c. In other words, the inner side portion 291 and the outer side portion 292 of the lead member 290 may be divided at an insulating film 295 attached on a contact part between the lead member 290 and the case 110, and the first and second cutting parts 290' and 290" may extend to the contact part whereon the insulating film 295 is attached.

However, the one or more embodiments are not limited thereto, and thus, in order to allow the other parts to be insulated from an ultrasonic vibration applied to the one of the first, second, and third parts 290a, 290b, and 290c, the first and second cutting parts 290' and 290" may exceed the inner side portion 291 and may extend to the outer side portion 292. That is, an extension length Lr of the first and second cutting parts 290' and 290" may physically affect an insulating characteristic between the first, second, and third parts 290a, 290b, and 290c, and the insulating characteristic may increase when the extension length Lr is increased. In another embodiment, the first and second cutting parts 290' and 290" may be formed only in the inner side portion 291 and may not extend to a boundary between the inner side portion 291 and the outer side portion 292.

The first, second, and third parts 290a, 290b, and 290c may have first, second, and third widths Wa, Wb, and We, respectively. The first, second, and third parts 290a, 290b, and 290c may be overlapped with the electrode tab 170 and may form the welding parts W1, W2, and W3 with the electrode tab 170, so that a total sum (Wa+Wb+We) of the first, second, and third widths Wa, Wb, and We may correspond to a total sum of widths of the welding parts W1, W2, and W3.

Each of the widths Wr1 and Wr2 of the first and second cutting parts 290' and 290" may be between about 0.5 mm and about 10 mm. The lowest value of 0.5 mm is set in consideration of a machining error with respect to the first and second cutting parts 290' and 290". In a case where each of the first and second cutting parts 290' and 290" has a width less than the lowest value of 0.5 mm, due to the machining error, the first, second, and third parts 290a, 290b, and 290c may not be spatially separated and individualized but may have remaining connection therebetween such that the first, second, and third parts 290a, 290b, and 290c may communicate with each other.

The greatest value of 10 mm is aimed to limit the widths Wr1 and Wr2 of the first and second cutting parts 290' and 290", so that the first, second, and third widths Wa, Wb, and We of the first, second, and third parts 290a, 290b, and 290c that substantially form charging and discharging current paths may be maintained at an appropriate level in order to make electrical resistance of charging and discharging paths maintained at a low level.

As described above, each of the widths Wr1 and Wr2 of the first and second cutting parts 290' and 290" may be designed to be between about 0.5 mm and about 10 mm, more particularly, each of the widths Wr1 and Wr2 of the first and second cutting parts 290' and 290" may be designed to be between about 0.5 mm and about 3 mm. In another embodiment, each of the widths Wr1 and Wr2 of the first and second cutting parts 290' and 290" may be designed to be between about 2 mm and about 3 mm.

As illustrated in FIG. 10, in the present embodiment in which at least two cutting parts 290' and 290" are formed, the first and second cutting parts 290' and 290" are used for physical insulation between the first, second, and third parts 290a, 290b, and 290c that are divided for individualization. Each of the first and second cutting parts 290' and 290" functions to prevent physical interference between the first, second, and third parts 290a, 290b, and 290c and to prevent a high frequency vibration accompanied with an ultrasonic vibration from propagating to the first, second, and third parts 290a, 290b, and 290c. Also, the first, second, and third parts 290a, 290b, and 290c are overlapped with the electrode tab 170 and form the welding parts W1, W2, and W3 with the electrode tab 170 by performing ultrasonic welding.

Regardless of the number of the first and second cutting parts 290' and 290", the first and second cutting parts 290' and 290" may have the widths Wr1 and Wr2, and the extension length Lr, which are sufficient to insulate the neighboring first, second, and third parts 290a, 290b, and 290c. Design factors related to the first and second cutting parts 290' and 290', for example, design factors related to the cutting part 190' that are described with reference to FIG. 6 may be equally applied to the structure including the first and second cutting parts 290' and 290".

In FIG. 10, reference numerals L1 and L2 respectively indicate a length of the inner side portion 291 and a length of the outer side portion 292 of the lead member 290.

Therefore, the present invention using coupling points W1, W2 and W3 mediate bonding between the lead member 190 and the plurality of the stacked electrode tabs 170, thus providing sufficient bonding strength via the use of space 190' on the lead member 190.

Since the coupling points W1, W2 and W3 are formed inside of the case 110, the coupling points are protected from the external surroundings. The coupling points are thus encapsulated by the case.

Also, if the plurality of the electrode tabs 170 are extracted from the case 110 without lead member 190 relaying the electrode tabs 170 and electric circuit outside of the case 110. Therefore, by employing the exemplary embodiments of the present invention, the thick stack of electrode tabs 170 do not extend through the case 110. If the thick stack of electrode tabs 170 passed through the case 110, sealing quality could be deteriorated due to the thick thickness of the plurality of the electrode taps penetrating though the gap between the upper and lower cases 111 and 112.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery, comprising:
an electrode assembly having a plurality of electrode plates and a plurality of separators, each separator of the plurality separators is disposed between each of the electrode plates of the plurality of electrode plates;
a plurality of electrode tabs extending from and electrically connected to each of the plurality of electrode plates, said plurality of electrode tabs forming a stack of electrode tabs by placing each electrode tab of the plurality of electrode tabs one upon another; and
a plurality of lead members, each of the plurality of lead members having a "U" shape cut and includes two ends in which a first end has a first part and a second part in the first end of each lead member with a space containing no material and no intervening structures between the first end and the second end, said first part and said second part are separated from each other by the space at the first end and connected at the second end,
wherein the first part and the second part of each lead member are each coupled to the stack of electrode tabs within a battery case.

2. The secondary battery recited in claim 1, wherein each lead member of the plurality of lead members has a flat rectangular shape.

3. The secondary battery recited in claim 1, wherein each electrode tab of the plurality of electrode tabs has a flat rectangular shape.

4. The secondary battery recited in claim 1, wherein an insulating member is located around each lead member of the plurality of lead members.

5. The secondary battery recited in claim 4, wherein the coupling point is between the electrode plate and the insulating member.

6. The secondary battery recited in claim 1, comprised of:
the plurality of electrode plates including a plurality of positive and negative electrode plates in which each separator of the plurality separators is disposed between each of the positive and negative electrode plates of the plurality of electrode plates,
the plurality of electrode tabs including a plurality of positive and negative tabs extending from and electrically connected to an uncoated portion of the positive and negative electrode plates respectively, said plurality of positive electrode tabs form a stack of positive electrode tabs by placing each of the positive electrode tabs one upon another and said plurality of negative electrode tabs form a stack of negative electrode tabs by placing each of the negative electrode tabs one upon another, and
the plurality of lead members including a plurality of positive and negative lead members, said first part and said second part of each the positive lead members are each welded to the stack of positive electrode tabs and said first part and the second part of each the negative lead members are each welded to the stack of negative electrode tabs.

7. The secondary battery recited in claim 1, wherein the space in each of the lead members partially extends longitudinally in each of the lead members to form the first and second parts the lead members.

8. The secondary battery recited in claim 7, wherein the width of the space is between about 0.5 mm and about 10 mm.

9. The secondary battery recited in claim 7, wherein the width of the space is between about 0.5 mm and about 3 mm.

10. The secondary battery recited in claim 7, wherein a relative ratio of a width (Wr) of the space with respect to a width (Wt) of the lead member is in the range of about 0.625% to about 12.5%, said relative ratio is Wr/Wt.

11. The secondary battery recited in claim 1, wherein the first part of each lead member includes a first weld part that encompasses a portion of the first part, and the second part of each lead member includes a second weld part that encompasses a portion of the second part.

12. The secondary battery recited in claim 11, comprised of the combined width of the first and second welding parts is in the range of about 70 mm to about 79.5 mm excluding the width of the space.

13. The secondary battery recited in claim 7, a width (Wr) of the space with respect to a width of the first welding part (Wa) and a width of the second welding part (Wb) is in a range where Wr/(Wa+Wb) is about 0.629% to about 14.286%.

14. The secondary battery recited in claim 7, wherein a relative ratio of a width (Wr) of the spacet with respect to a width (Wt) of the lead member is in the range of about 0.625 to about 3.75%, said relative ratio is Wr/Wt.

15. The secondary battery recited in claim 7, wherein the first part and the second part of each lead member are each welded to the stack of electrode tabs by ultrasonic welding.

16. The secondary battery recited in claim 1, wherein the space includes two spaces that forms a first part, a second part and a third part in the first end of each lead member, said first, second and third part are independent and separate from each other.

17. The secondary battery recited in claim 16, wherein the space is at least two separate spaces in each of the lead members and that partially extend longitudinally in each of the lead members to form a first, second and third parts of the lead members.

* * * * *